United States Patent [19]

Kawakami et al.

[11] Patent Number: 5,422,036
[45] Date of Patent: Jun. 6, 1995

[54] LIQUID CRYSTAL DISPLAY DEVICE AND PREPARATION THEREOF

[75] Inventors: Yuhsuke Kawakami, Aichi; Kouji Hara, Osaka; Tohru Kashiwagi, Osaka; Junichi Ono, Osaka; Kensaku Takata, Osaka, all of Japan

[73] Assignee: Sumitomo Electric Industries, Ltd., Osaka, Japan

[21] Appl. No.: 300,523

[22] Filed: Sep. 6, 1994

Related U.S. Application Data

[63] Continuation of Ser. No. 892,334, Jun. 2, 1992, abandoned.

[30] Foreign Application Priority Data

Jun. 3, 1991 [JP] Japan .................................. 3-130981
Apr. 10, 1992 [JP] Japan .................................. 4-091050

[51] Int. Cl.$^6$ .................. C09K 19/52; C09K 19/12; C09K 19/20; G02F 1/13
[52] U.S. Cl. .................. 252/299.01; 252/299.66; 252/299.67; 359/103
[58] Field of Search .................. 252/299.01, 299.66, 252/299.67; 359/103

[56] References Cited

U.S. PATENT DOCUMENTS

| | | | |
|---|---|---|---|
| 4,954,600 | 9/1990 | Hachiya | 528/89 |
| 5,034,153 | 7/1991 | Uchida et al. | 252/299.65 |
| 5,190,687 | 3/1993 | Hachiya et al. | 252/299.01 |
| 5,200,108 | 4/1993 | Yuasa et al. | 252/299.01 |

FOREIGN PATENT DOCUMENTS

| | | |
|---|---|---|
| 0231770 | 8/1987 | European Pat. Off. . |
| 2030154 | 2/1987 | Japan . |
| 2127494 | 5/1990 | Japan . |
| 2193115 | 7/1990 | Japan . |
| 2202981 | 8/1990 | Japan . |
| 3153752 | 7/1991 | Japan . |
| 3153753 | 7/1991 | Japan . |

OTHER PUBLICATIONS

Kajiyama et al. "Aggregation States and bistable Light Switching of (Liquid Crystalline Polymer)/(Low Molecular Weight Liquid Crystal) Mixture Systems", Chemistry Letters, pp. 817–820, 1989.
Polymer Preprints, Japan, vol. 39, No. 8, 2373 (1990).

*Primary Examiner*—Robert L. Stoll
*Assistant Examiner*—C. Harris
*Attorney, Agent, or Firm*—Cushman, Darby & Cushman

[57] ABSTRACT

A liquid crystal display device having a pair of electrodes at least one of which is transparent and a composite film which is placed between the pair of electrode and contains a low molecular weight liquid crystal, a side-chain type polymer liquid crystal having a backbone of polyoxetane and a mesogen group in a side chain, and an electrolyte, which composite film has a self-supporting property and prevents formation of a short-circuit between the-electrodes.

6 Claims, No Drawings

LIQUID CRYSTAL DISPLAY DEVICE AND PREPARATION THEREOF

This is a continuation of application Ser. No. 08/892,334, filed on Jun. 2, 1992, which was abandoned upon the filing hereof.

BACKGROUND OF THE INVENTION

1. Field of the Invention

The present invention relates to a liquid crystal display device which can be used, for example, for a TV screen, various office automation instruments and other display panels and a method for preparing the liquid crystal display device.

2. Description of the Related Art

Hitherto, a liquid crystal display device has been formed by injecting a liquid crystal material between a pair of transparent electrodes which are fixed with a gap of several micrometers. However, the above structure cannot give the preparation of the display having a large area.

In addition, brightness of the screen and an angle of view field are insufficient, since it is necessary to attach polarization plates having polarization axes which are perpendicular to each other to a pair of glass substrates enclosing the liquid crystal material.

In addition, except one using a ferroelectric liquid crystal, in the conventional liquid crystal display device, an orientated state has no memory so that an active matrix driving such as TFT which is produced in a low yield should be used to produce a display screen having a large number of picture elements. Therefore, the production cost increases. When the ferroelectric liquid crystal is used, a very thin cell gap control of 1 to 2 $\mu$m and a uniform orientation of liquid crystal molecules are necessary, so that the ferroelectric liquid crystal cannot provide a satisfactory display even in a small area.

Recently, a new liquid crystal display device has been developed (cf. Japanese Patent Kokai Publication Nos. 193115/1990 and 127494/1990, Chem. Lett., 817 (1989) and Polymer Preprints, Japan Vol. 39, No. 8, 2372 (1990)). This device is prepared by casting and coating a solution of a polymer having a side chain of a structure corresponding to a liquid crystal compound and a conventional low molecular weight liquid crystal in a solvent on a plate-form support or a film such as a transparent electrode, drying and solidifying the solution to form a mixture film of the polymer liquid crystal and the low molecular weight liquid crystal and placing another support thereon. In this system, a side-chain type polymer liquid crystal and a low molecular weight liquid crystal form a homogeneous mixture and are not phase-separated.

In the above liquid crystal display device, when a low frequency or a direct current is applied on the mixture film, ions move in accordance with an electric field in the mixture film so that the orientation of the liquid crystal molecules is disturbed and the film becomes opaque. When a high frequency is applied on the mixture film, the liquid crystal molecules in the film are homeotropically orientated by an electro-optical effect, so that an incident light passes through the film without being scattered and the film becomes transparent. A polymer liquid crystal or a polymer chain is essential for this display mode. Without a polymer liquid crystal or a polymer chain, the mixture film does not change to an opaque state.

In this liquid crystal display device, after the electric field is removed, the display device has memory and maintains scattered or non-scattered states of light stably. In addition, since this liquid crystal display device is easily prepared by coating the solution of the polymer liquid crystal and the low molecular weight liquid crystal and drying it to form the mixture film of the polymer liquid crystal and the low molecular weight liquid crystal, a liquid crystal display having a large area is easily prepared.

However, since the conventional mixture film of the polymer liquid crystal and the low molecular weight liquid crystal contains a single low molecular weight liquid crystal, a temperature range of a smectic state which has memory is narrow so that the liquid crystal display does not work at room temperature.

Polymer Preprints, Japan, Vol. 39, No. 8, 2373 (1990) discloses a system containing two kinds of low molecular weight liquid crystals, one of which substitutes a mesogen group of the polymer liquid crystal. Therefore, a content of the polymer liquid crystal in the mixture film is decreased, so that the mixture film is soft, loses a self-supporting property and cannot be practically used. Since the mixture film is not self-supporting, a flexible liquid crystal display device cannot be prepared using such film, or a short-circuit is easily formed between the electrodes.

SUMMARY OF THE INVENTION

One object of the present invention is to provide a liquid crystal display device which has a good self-supporting property and good response and does not form a short-circuit between electrodes.

Another object of the present invention is to provide a method for preparing such liquid crystal display device.

According to the present invention, there is provided a liquid crystal display device comprising a pair of electrodes at least one of which is transparent and a mixture film which is placed between said pair of electrode and comprises a low molecular weight liquid crystal, a side-chain type polymer liquid crystal having a backbone of polyoxetane and a mesogen group in a side chain, and an electrolyte.

According to the present invention, there is also provided a method for preparing a liquid crystal display device comprising coating one of a pair of electrodes at least one of which is transparent with a solution of said side-chain type polymer liquid crystal, said low molecular weight liquid crystal and the electrolyte in a common solvent, drying said coated solution to form said mixture film, and placing the other electrode on said mixture film.

DETAILED DESCRIPTION OF THE INVENTION

According to the present invention, the side-chain type polymer liquid crystal has the polyoxetane backbone. Since the polyoxetane backbone is harder than other polyether chains and polysiloxane chains, the mixture film of such side-chain type polymer liquid crystal and the low molecular weight liquid crystal has a sufficiently high self-supporting property, prevents short-circuit between the electrodes and achieves stable response even when a content of the polymer liquid crystal is small.

A weight ratio of the side-chain type polymer liquid crystal to the low molecular weight liquid crystal may change depending on the structures of the liquid crystals and is preferably from 2:8 to 8:2, preferably from 3:7 to 7:3. When the ratio of the polymer liquid crystal is larger than the above ratio, a response speed decreases. When the ratio of the low molecular weight liquid crystal is larger than the above ratio, the mixture film may lose the self-supporting property. Since the polymer liquid crystal to be used in the present invention has the stiff backbone as explained above, a small amount of the side-chain type polymer liquid crystal can impart the self-supporting property to the mixture film. Therefore, a weight ratio of the polymer liquid crystal to the low molecular weight liquid crystal can be decreased to 0.5:9.5.

The side-chain polymer liquid crystal used in the present invention can be prepared by polymerizing an oxetane derivative having a substituent group corresponding to the side chain of the polymer.

Examples of the side-chain polymer having the polyoxetane backbone are as follows:

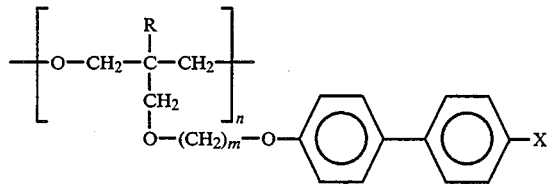
(1)

wherein R is a hydrogen atom, a $C_1$–$C_6$ alkyl group, a fluorine atom or a trifluoromethyl group, X is an electron attractive group or an alkoxy group, n is a polymerization degree of, preferably, from 2 to about 1000, and m is an integer of 1 to 20,

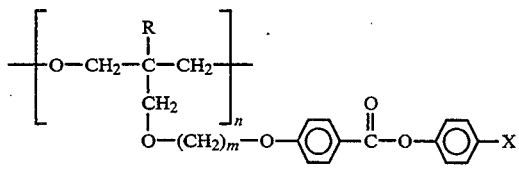
(2)

wherein R, X, m and n are the same as defined above,

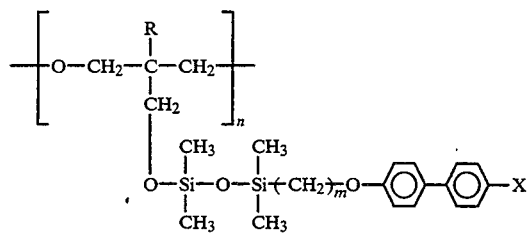
(3)

wherein R, X, m and n are the same as defined above,

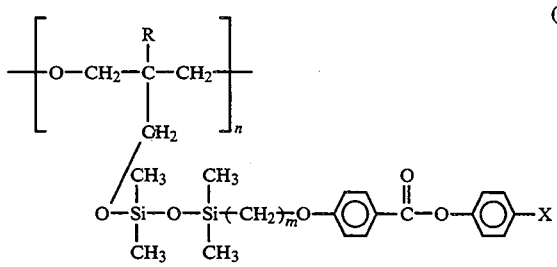
(4)

wherein R, X, m and n are the same as defined above,

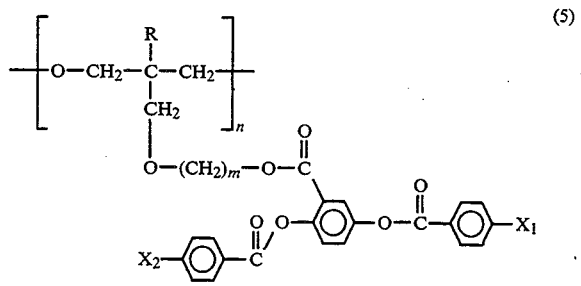
(5)

wherein R, m and n are the same as defined above, and $X_1$ and $X_2$ are the same or different and each an electron attractive group or an alkoxy group, in particular, $X_1$ is an alkoxy group and $X_2$ is an electron attractive group,

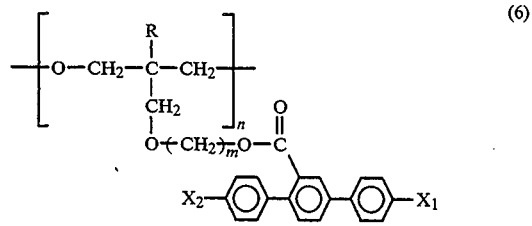
(6)

wherein R, X1, X2, m and n are the same as defined above.

The polyoxetane backbone of the side-chain type polymer to be used according to the present invention is more difficultly internally rotated than a polysiloxane bond forming a backbone of a conventional side-chain type polymer liquid crystal. In relation to the mesogen group, it is possible to provide a biphenyl structure having the substituent X at the para-position instead of introducing a phenyl group by an ester bond as in the conventional polymer liquid crystal. Accordingly, the side-chain type polymer liquid crystal has a high phase transfer temperature.

The substituent X is an important group to impart a liquid crystal property to the polymer and can be the electron attractive group or the alkoxy group. Examples of the electron attractive group are a cyano group, a nitro group, an acyl group (e.g. an acetyl group), a halogen atom (e.g. fluorine, chlorine, bromine and iodine atoms), and the like. Examples of the alkoxy group are those having 1 to 6 carbon atoms such as an methoxy group, an ethoxy group, a propoxy group, an isopropoxy group, a butoxy group, a tert.-butoxy group, a pentyloxy group, a hexyloxy group and the like. Among them, a cyano group or a fluorine atom is preferred since a phase transition temperature of the liquid crystal phase can be increased.

Examples of the alkyl group are those having 1 to 6 carbon atoms such as a methyl group, an ethyl group, a propyl group, a butyl group, a tert.-butyl group, a hexyl group and the like.

The polymerization degree n of the polymer crystal liquid is not critical, and is preferably from 2 to about 1000.

The side-chain polymer liquid crystal to be used according to the present invention may be prepared by cationic polymerization of a corresponding oxetane monomer.

As the low molecular weight liquid crystal, any of conventionally used low molecular weight liquid crystals may be used.

The above side-chain type polymer liquid crystal may be a smectic or nematic one. When both the polymer liquid crystal and the low molecular weight liquid crystal show nematic phases, it is necessary to select a combination of them which induces a smectic phase.

The low molecular weight liquid crystal is preferably one that substitutes the side chain liquid crystal group of the polymer liquid crystal or a mixture of low molecular weight liquid crystals at least one of which is one that substitutes the side chain liquid crystal group of the polymer liquid crystal.

When the polymer liquid crystal is one of the above polymer liquid crystals of the formulas (1) and (2), a low molecular weight liquid crystal which substitutes the side chain liquid crystal group of the polymer liquid crystal may be at least one of the following compounds:

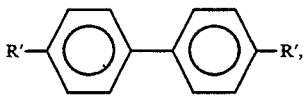
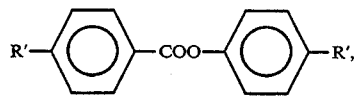
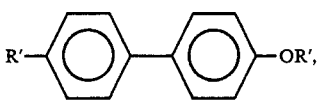
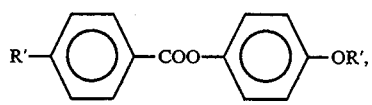
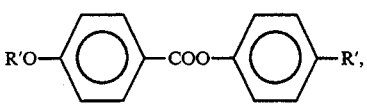
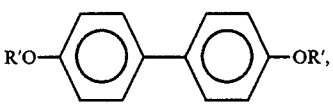
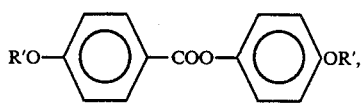
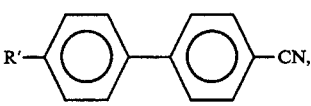
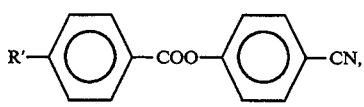
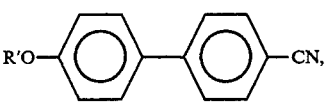
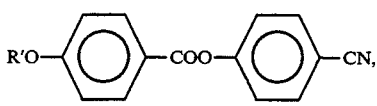
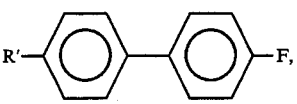
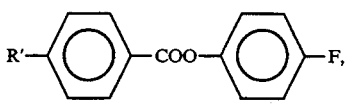
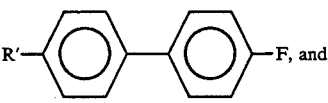
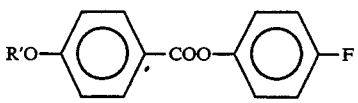

wherein R' is a $C_1$-$C_6$ alkyl group, and the phenyl group may be substituted with a cyclohexyl group and the like.

As the electrolyte, any one that is dissolved in a coating liquid can be used. A preferred example of the electrolyte is a quaternary ammonium salt of the formula:

wherein $R^1$, $R^2$, $R^3$ and $R^4$ are the same or different and each a straight or branched $C_1$-$C_6$ alkyl group, and $Y^-$ is a counter anion such as $F^-$, $Cl^-$, $Br^-$, $I^-$, $ClO_4^-$, $PF_4^-$ or $BF_4^-$.

One or more electrolytes may be used.

An amount of the electrolyte is usually from 0.005 to 1% by weight based on the whole weight of the mixture film.

The electrolyte improves the response speed of the mixture film due to its ions and also makes a change from the opaque state to the transparent state or from the transparent state to the opaque state surely.

The mixture film according to the present invention may contain a conventional dichromic dye to provide a color display device.

Further, to achieve good balance of the properties of the mixture film, the film may contain other side-chain type polymer liquid crystal.

As the electrode, any of conventionally used electrodes may be used. Examples of the electrodes are glass plates or plastic films (e.g. films of polyethylene terephthalate (PET), polyether sulfone (PES), etc.) on which a conductive film such as ITO (indium tin oxide) or SnO$_2$ is formed by evaporation or sputtering.

The liquid crystal display may be prepared by coating a solution of the polymer liquid crystal, the low molecular weight liquid crystal and the electrolyte in the solvent on at least one of the electrodes, drying and solidifying the solution to form the mixture film and placing the other electrode on the mixture film.

The solvent may be selected according to the kinds of the polymer liquid crystal, the low molecular weight liquid crystal and the electrolyte.

The solution may be coated on the electrode by a conventional method, for example, by bar coating, spin coating, spray coating or roll coating.

Alternatively, the liquid crystal display device may be prepared by placing a mixture of the low molecular weight liquid crystal, the polymer liquid crystal, the electrolyte and a spacer on one of a pair of the electrodes, and laminating the other electrode on the mixture using at least one roll.

The spacer acts to maintain a certain gap between the pair of the electrodes. Examples of the spacer are glass rods, plastic balls, silica balls and the like.

Since the polymer liquid crystal has the polyoxetane backbone and the side chain liquid crystal group, movement of the polymer chains is suppressed so that the phase transition temperature becomes high and the temperature range of the liquid crystal phase is raised, whereby long-term heat resistance is significantly increased and also the short-circuit is prevented.

In the case of the polymer liquid crystal having a fluorine atom or a trifluoromethyl group at the end of the diphenyl group, decrease of viscosity and then increase of responsibility are expected.

In addition, since the polymer liquid crystal having the structure of the formula (5) or (6) is a nematic one, a response speed of the liquid crystal display device can be increased.

As explained above, since the polymer liquid crystal has the polyoxetane backbone, movement of the polymer chain is decreased and the phase transition temperature is increased, so that a temperature range of the liquid crystal phase is raised. Accordingly, not only the long-term heat stability is considerably improved but also the short-circuit of the electrodes is effectively prevented.

Since one mesogen group is attached to one comparatively long oxetane repeating unit having one oxygen atom and three carbon atoms in a linear part of the unit, a pair of adjacent mesogen groups have a very weak interaction so that the liquid crystal display device has a high response speed.

PREFERRED EMBODIMENTS OF THE INVENTION

The present invention will be illustrated by following Examples, in which "parts" are by weight.

Example 1

In a mixed solvent of acetone and dichloroethane in a weight ratio of 50:50, 10 parts of poly3-{[[5-(4-cyanobiphenyl-4'-yl)oxy]pentyloxy]methyl}-3-methyloxetane as a polymer liquid crystal, 90 parts of a mixture of low molecular weight liquid crystals (S2, a smectic mixed liquid crystal by Merk Japan) which may contain a low molecular weight liquid crystal substituting the liquid crystal groups of the polymer liquid crystal and 0.05 % by weight of tetraethylammonium bromide per a total weight of the polymer liquid crystal, the low molecular weight liquid crystals and tetraethylammonium bromide were dissolved to prepare a coating solution.

The coating solution was coated on a transparent conductive film (ITO-PES) having a thickness of 100 μm with a bar coater and dried at room temperature for 30 minutes to form a mixture film. Then, on the mixture film, another transparent conductive film was laminated to produce a liquid crystal display device.

Example 2

In the same manner as in Example 1 but using, as a polymer liquid crystal, 10 parts of poly3-{[[5-(4-cyanobiphenyl-4'-yl)oxy]pentyloxy]methyl]-3-methyloxetane, as a low molecular weight liquid crystal which substitutes the side-chain liquid crystal group, 80 parts of S2 and, as an additional liquid crystal, 10 parts of E 31 LV (a mixture of at least seven low molecular weight liquid crystals, distributed by Merk Japan), a coating solution was prepared and a liquid crystal display device was produced.

Example 3

In the same manner as in Example 1 but using, as a polymer liquid crystal, 20 parts of poly3-{[[5-(4-cyanobiphenyl-4'-yl)oxy]pentyloxy]methyl}-3-methyloxetane and, as a low molecular weight liquid crystal which substitutes the side-chain liquid crystal group, 80 parts of 4-octyl-4cyanobiphenyl (8CB), a coating solution was prepared and a liquid crystal display device was produced.

Example 4

In the same manner as in Example 1 but using, as a polymer liquid crystal, 20 parts of poly3-{[[5-(4-cyanobiphenyl-4'-yl)oxy]pentyloxy]methyl}-3-methyloxetane, as a low molecular weight liquid crystal which substitutes the side-chain-liquid crystal group, 70 parts of 8CB and, as an additional liquid crystal, 10 parts of 4-n-pentylbenzoic acid 4'-n-octyloxybiphenyl ester, a coating solution was prepared and a liquid crystal display device was produced.

Example 5

In the same manner as in Example 1 but using, as a polymer liquid crystal, 30 parts of poly3-{[[5-(4-cyanobiphenyl-4'-yl)oxy]pentyloxydimethylsiloxydimethylsiloxy]methyl]-3-methyloxetane and, as a low molecular weight liquid crystal, 70 parts of E 63 (a mixture of at least five low molecular weight liquid crystals, distributed by Merk Japan), a coating solution was prepared and a liquid crystal display device was produced.

Example 6

In the same manner as in Example 1 but using, as a polymer liquid crystal, 20,parts of poly3-{[[5-(4-fluorobiphenyl-4'-yl)oxy]pentyloxy]methyl}-3-methyloxetane and, as a low molecular weight liquid crystal which substitutes the side-chain liquid crystal group, 80 parts of 8CB, a coating solution was prepared and a liquid crystal display device was produced.

Comparative Example 1

In the same manner as in Example 1 but using, as a polymer liquid crystal, 20 parts of a polymer comprising repeating units of the formula:

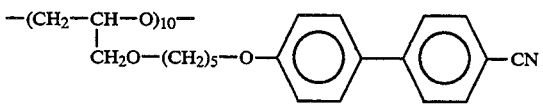

and, as a low molecular weight liquid crystal which substitutes the side-chain liquid crystal group, 80 parts of 8CB, a coating solution was prepared and a liquid crystal display device was produced.

Comparative Example 2

In the same manner as in Comparative Example 1 but using, as a polymer liquid crystal, a polymer comprising repeating units of the formula:

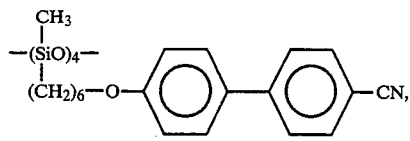

a coating solution was prepared and a liquid crystal display device was produced.

With each of the liquid crystal display devices produced in Examples and Comparative Examples, its performance, namely a response time was measured as follows:

On the liquid crystal display device, an alternating current of 1 kHx, 60 V was applied. Then, a response time in which the display device was changed from a transparent state to an opaque state and from the opaque state to the transparent state was measured by radiating a He-Ne laser beam having a wavelength of 633 nm).

The results are shown in the Table together with a smectic temperature range of the mixture film.

TABLE

| Example | Response time (sec.) Transparent → Opaque | Response time (sec.) Opaque → Transparent | Smectic temperature range (°C.) |
| --- | --- | --- | --- |
| 1 | 0.26 | 1.52 | 23–70 |
| 2 | 0.19 | 1.20 | 23–62 |
| 3 | 0.25 | 0.40 | 23–68 |
| 4 | 0.47 | 0.95 | 23–72 |
| 5 | 0.38 | 0.62 | 23–58 |
| 6 | 0.36 | 0.82 | 23–65 |
| Comp. 1 | *) | | 23–45 |
| Comp. 2 | *) | | 23–50 |

Note: *) The mixture film was not self-supporting and the conductive films were peeled off.

As understood from the results of the Table, the liquid crystal display devices produced in Examples 1–6 had a very short response time, which means that the devices had good response.

In Comparative Examples 1 and 2, when the weight ratio of the polymer liquid crystal to the low molecular weight liquid crystal was the same as that in Example 3, the mixture film had no self-supporting property so that the transparent electrode films were peeled off and no device was actually produced.

In addition, the mixture films of Examples 1–6 had a wider smectic temperature range than those of Comparative Examples 1 and 2.

What is claimed is:

1. A liquid crystal display device comprising a pair of electrodes at least one of which is transparent and a mixture film which is placed between said pair of electrodes and comprises a low molecular weight liquid crystal, a side-chain type polymer liquid crystal having a backbone of polyoxetane and a mesogen group in a side chain, and an electrolyte, wherein said side-chain type polymer liquid crystal is at least one selected from the group consisting of a polymer comprising repeating units of the formula:

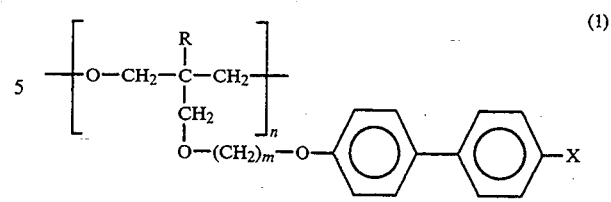

wherein R is a hydrogen atom, a $C_1$–$C_6$ alkyl group, a fluorine atom or a trifluoromethyl group, X is an electron attractive group selected from the group consisting of $F^-$, $Cl^-$, $Br^-$ and $I^-$ or an alkoxy group having 1 to 6 carbon atoms, n is a polymerization degree from 2 to about 1000 and m is an integer of 1 to 20, a polymer comprising repeating units of the formula:

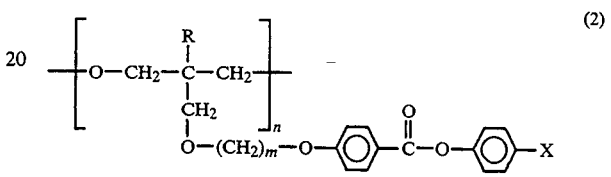

wherein R, X, m and n are the same as defined above, a polymer comprising repeating units of the formula:

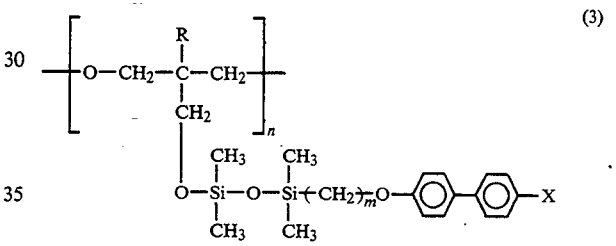

wherein R, X, m and n are the same as defined above, a polymer comprising repeating units of the formula:

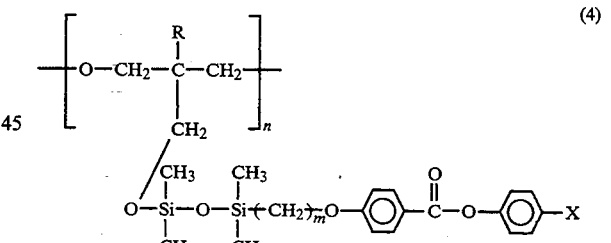

wherein R, X, m and n are the same as defined above, a polymer comprising repeating units of the formula:

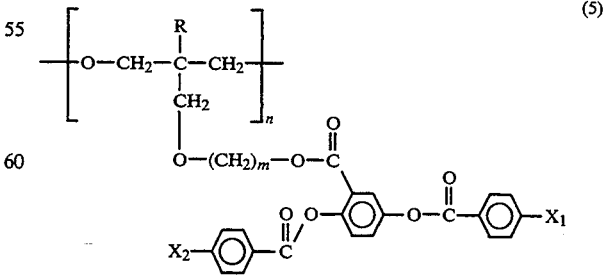

wherein R, m and n are the same as defined above, and $X_1$ and $X_2$ are the same or different and each an electron attractive group selected from the group consisting of $F^-$, $Cl^-$, $Br^-$ and $I^-$ or an alkoxy group having 1 to 6 carbon atoms, and a polymer comprising repeating units of the formula:

the side chain liquid crystal group of the polymer liquid crystal may be at least one of the following compounds:

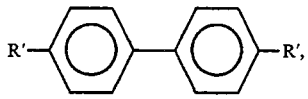

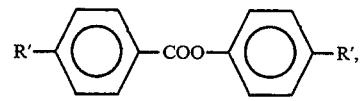

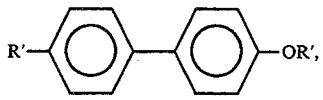

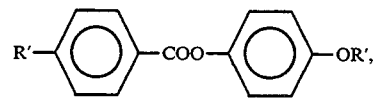

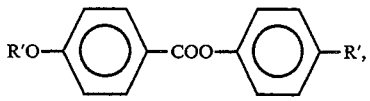

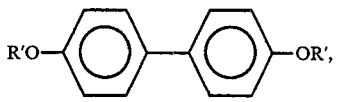

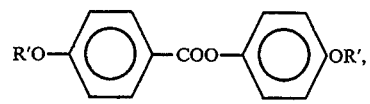

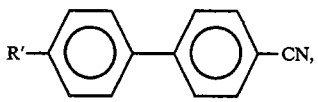

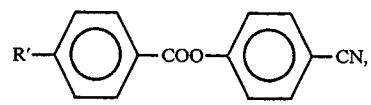

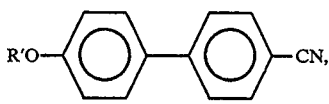

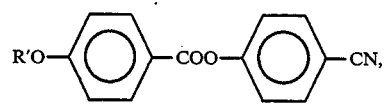

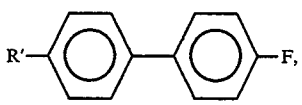

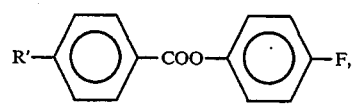

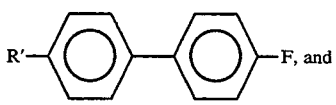

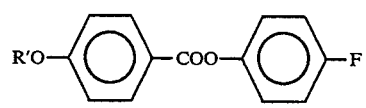

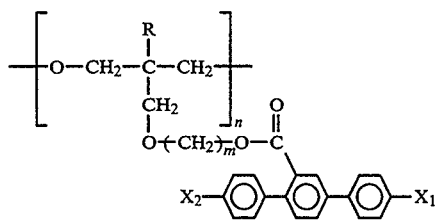

(6)

wherein R, $X_1$, $X_2$, m and n are the same as defined above.

2. The liquid crystal display device according to claim wherein said low molecular weight liquid crystal is one that substitutes the side chain liquid crystal group of the polymer liquid crystal or a mixture of low molecular weight liquid crystals at least one of which is one that substitutes the side chain liquid crystal group of the polymer liquid crystal.

3. The liquid crystal display device according to claim 1, wherein said polymer liquid crystal is one of the polymer liquid crystals of the formulas (1) and (2), and a low molecular weight liquid crystal which substitutes wherein R' is a $C_1$-$C_6$ alkyl group.

4. The liquid crystal display device according to claim 1, wherein a content of said electrolyte is from 0.005 to 1% by weight based on a whole weight of said mixture film.

5. The liquid crystal display device according to claim 1, wherein said electrolyte is a quaternary ammonium salt.

6. The liquid crystal display device according to claim 5, wherein said quaternary ammonium salt is a compound of the formula:

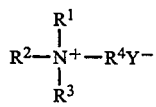

(7)

wherein $R^1$, R2, R3 and $R^4$ are the same or different and each a straight or branched $C_1$-$C_6$ alkyl group, and Y' is a counter anion selected from the group consisting of $F^-$, $Cl^-$, $Br^-$, $I^-$, $ClO_4^-$, $PF_4^-$ and $BF_4^-$.

* * * * *